Aug. 21, 1951  F. CHRISTOFFERSEN  2,565,168
HAY STACK CUTTER
Filed Aug. 5, 1949  2 Sheets-Sheet 1

Inventor
Fred Christoffersen
By
Attorneys

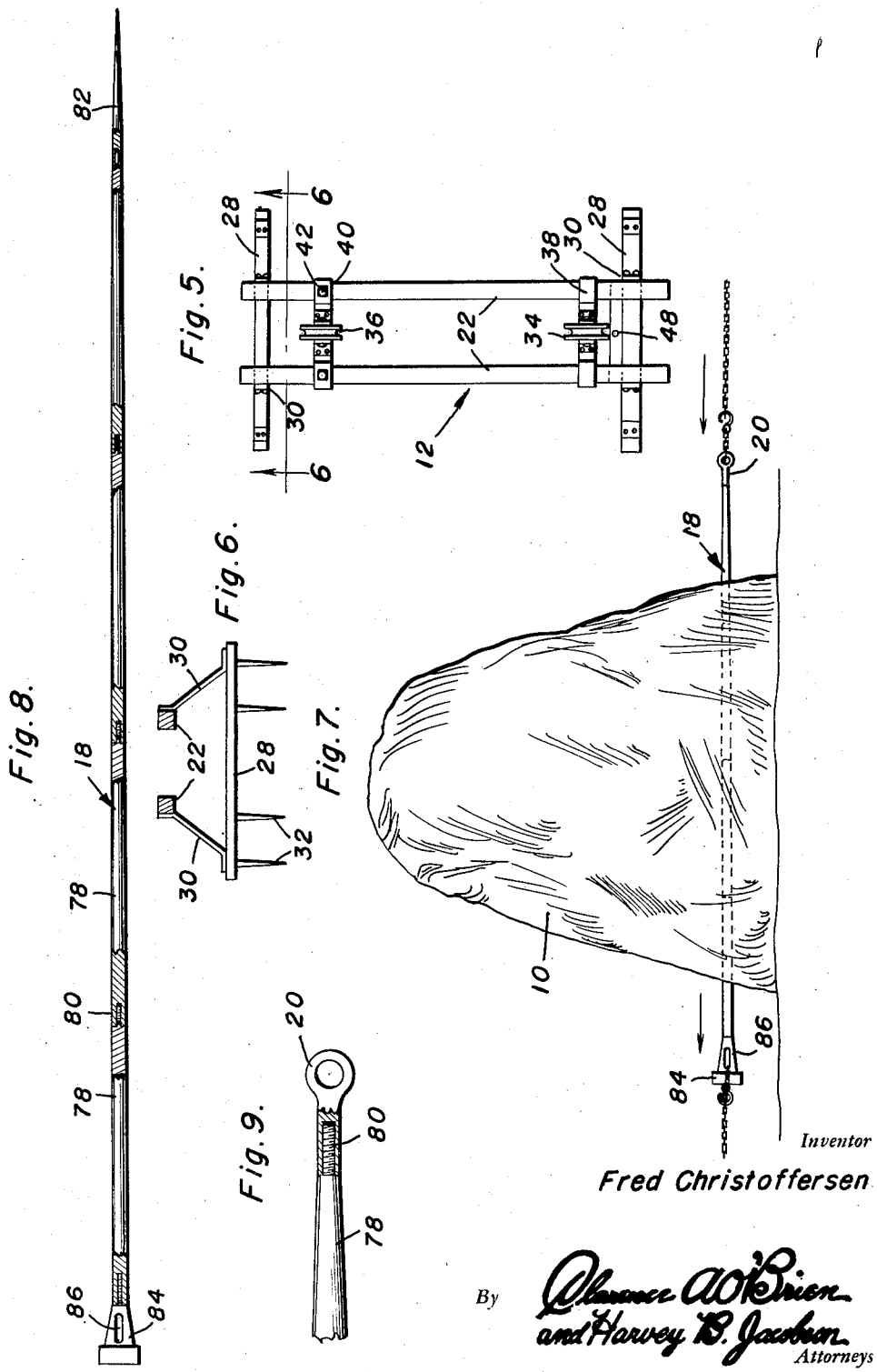

Patented Aug. 21, 1951

2,565,168

UNITED STATES PATENT OFFICE 2,565,168

HAYSTACK CUTTER

Fred Christoffersen, Blair, Nebr.

Application August 5, 1949, Serial No. 108,732

5 Claims. (Cl. 146—70)

This invention relates generally to cutters for bulk material, and more particularly to apparatus for cutting a hay stack.

A primary object of this invention is to provide means for cutting a hay stack at a plurality of levels and both vertically and horizontally as desired.

Yet another object of this invention is to provide equipment for cutting a hay stack which will be comparatively light in weight and not excessively bulky, so that the equipment can be easily transported.

Another object is to provide means for cutting a hay stack, wherein a tower is removably mounted upon the hay stack, thus obviating the necessity of anchoring a tower or analogous structure in the ground or supporting an analogous structure on a truck or tractor.

Another object, ancillary to the preceding objects, is the general facilitation of the process of cutting a hay stack, without costly equipment.

And a last object to be mentioned specifically is to provide means for cutting a hay stack which means is inexpensive and practicable to manufacture, safe and simple to use, and which will give generally efficient and durable service, and it should be specifically pointed out that this invention has for one of its objects the provision of a method for carrying out the cutting of a hay stack, as will be hereinafter described in detail.

With these and other objects which will appear hereinafter as this description proceeds, this invention resides in certain novel features of construction, combination and arrangement of elements and portions as will be hereinafter described in detail in the specification, the above mentioned method being also set forth, the apparatus and method being both illustrated in the accompanying drawings, in which:

Figure 5 is an elevational view of the tower, as viewed from the left hand side of Figure 1;

Figure 6 is a horizontal sectional view of the tower, taken on the line 6—6 of Figure 5 and looking in the direction of the arrows;

Figure 7 is an elevational view designed to show how a needle is used to thread a cable through the hay stack;

Figure 8 is an elevational view of a suitable needle, portions thereof being broken away and the underlying portions being shown in vertical section and in elevation in order to illustrate the sectionalized character of the needle; and, Figure 9 is a fragmentary view of a section of the needle and an eye member secured thereto, this structure being also shown in elevation in Figure 7.

Similar characters of reference designate similar or identical elements or portions throughout the specification and throughout the different views in the drawings.

Figure 1:
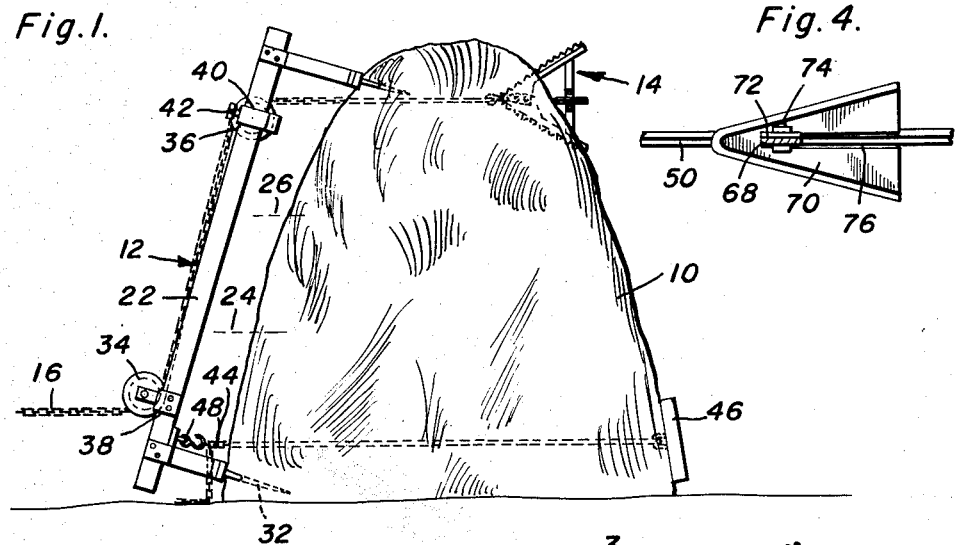
Figure 1 is a side elevational view of the hay stack cutter assembly, operatively mounted upon a hay stack.

Referring now to the drawings in detail, this invention is adapted to be used with an environment including a hay stack 10, and an important element of the invention resides in the tower generally indicated at 12 and illustrated in Figures 1, 5 and 6. Another important element of this invention is the cutter indicated generally at 14. The other chief elements of this invention may be considered the cable 16 which is used to pull the cutter through the hay stack, the needle 18 which is used in threading this cable as well as another cable hereinafter mentioned through the hay stack, and an eye member 20 which is used to replace the pointed section of the needle, all hereinafter described.

Describing now the construction of the tower 12 in greater detail, a pair of inflexible beams 22 comprise the main framework of the tower, and these beams are coextensive and of a length corresponding substantially with the height of the tallest hay stack wherewith the device will be used, since cuts are made at levels indicated at 24 and 26 and at locations near the top and bottom of the hay stack according to the desire of the user. A pair of fixed cross bars 28 are rigidly secured, as indicated at 30, on the beams 22, the elements 30 comprising spacers whereby the cross bars are offset from the beams 22 as will best be understood from an inspection of Figure 6. These cross bars 28 carry a plurality of spike members 32 disposed in the same direction and adapted to engage the hay in the stack, in a manner illustrated in Figure 1.

A lower pulley 34 and an upper pulley 36 are mounted on the tower, the lower pulley being fixed thereto by a bracket 38 extending transversely of and secured to and between the beams 22, while the upper pulley 36 is mounted on a bracket 40 which is adjustable longitudinally of the beams 22, securement being made by a pair of large set screws 42 which are threaded into end portions of the bracket 40 and engage the beams 22 in clamping relation.

A cable 44 has a relatively large block 46 secured to one end and adapted to serve as an anchor for the cable 44, on the side of the hay stack 10 remote from the tower 12. It will be understood that the needle 18 is used to facilitate the threading of the cable 44 through the hay stack, and after such threading is accomplished, the other end of the cable 44 is secured to a hook 48 secured to the tower in any suitable manner and disposed preferably between the cross bars 28.

Figure 2:
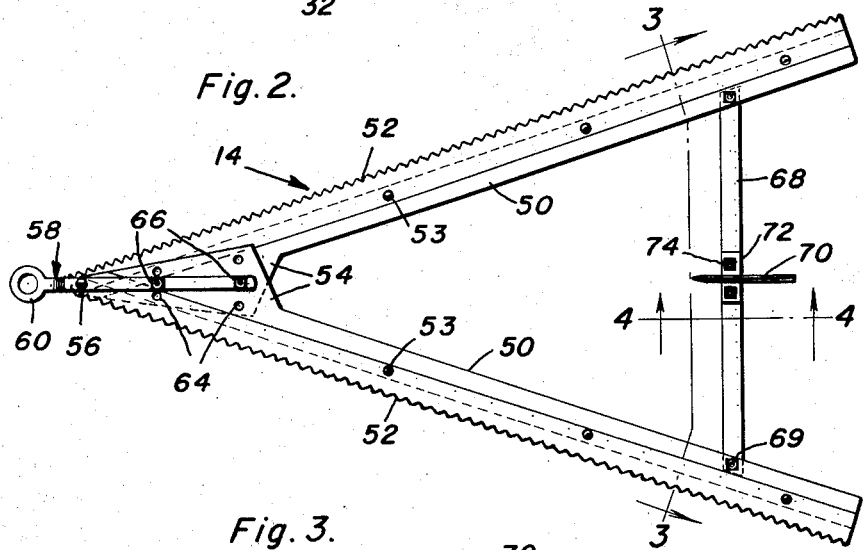
Figure 2 is a plan view of the cutter.

The cutter 14 comprises a pair of arms 50 having a plurality of cutting teeth on the outer edges thereof and the arms are divergent, as best illustrated in Figure 2. The cutting teeth 52 may be integrated with elongated plates and these plates may be secured as by rivets or bolts 53 upon the arms 50, the embodiment illustrated including arms which are longitudinally recessed to receive the said plates carrying the cutting teeth 52. Each of the arms 50 has plate portions 54 adjacent the pivot pin 56 used to link the arms together, and these arms are also linked to a bifurcated drawbar 58, through which the pivot pin 56 also passes. The drawbar 58 has an attachment ring 60 and the furcations 62 have spaced apertures 64 for selectively receiving further attaching pins or bolts 66, the apertures 64 being arranged so that the width of the cutter 14 can be varied by changing the divergent angle of the arms 50.

Figure 4:
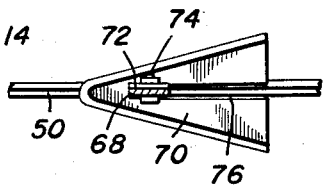
Figure 4 is a transverse vertical sectional view, taken on the line 4—4 in Figure 2.
Figure 3:
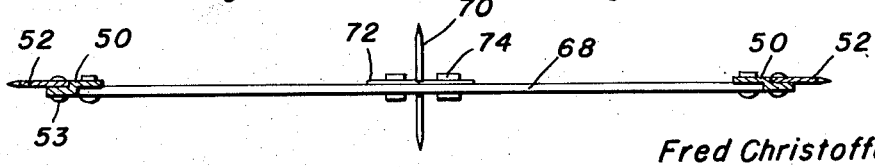
Figure 3 is a vertical sectional view of the cutter, taken on the line 3—3 in Figure 2.
Figure 10:
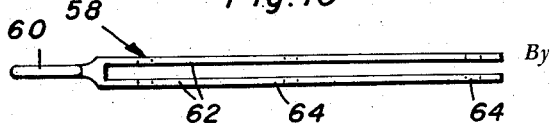
Figure 10 is a top plan view of the bifurcated drawbar.

In connection with the adjustability of the width of the cutter, it should be carefully noted that the cutter includes a replaceable bar 68 disposed transversely of the cutter and connected as indicated by the bolts 69 on the inner edge portions of the arms near the divergent ends thereof. When the cutter is adjusted as to effective width, a transverse bar 68 of a different length will be required to be used. The transverse bar 68 carries a guiding knife 70, best illustrated in Figures 2, 3 and 4, this knife extending both above and below the transverse bar 68 and being mounted thereon by means of an attachment plate 72 and bolts 74, and it will be noted that the guiding knife 70 is slotted as indicated at 76 to allow the insertion of the knife over the transverse bar. The guiding knife, of course, guides the cutter against any undue wobbling action as the cutter is drawn through the hay stack.

The apparatus provided according to this invention also includes the needle 18, already mentioned, and this needle is constructed of graduated sections 78, each section having a threaded bore at one end and a threaded coaxially arranged pin on the other end, as indicated at 80, to facilitate the disassembly of the needle for transportation purposes. The smallest section 82 is pointed and the threaded pin 80 thereof is used for connection of an eye member 20, as best illustrated in Figures 7 and 9. Finally, the needle is provided with a terminal 84 which may serve as an anvil during the insertion of the needle into the hay stack and this terminal 84 has an eye 86 to facilitate securement of a cable thereto.

The operation of this invention will be clearly understood from a consideration of the foregoing description of the mechanical details thereof, taken in connection with the above recited objects and the disclosures in the drawings.

In recapitulation, and by way of further explanation of the method in this invention, it may be noted that the needle 18 will first be driven into the hay stack, near the base thereof, so that the pointed section 82 will extend from the other side of the hay stack. This pointed section is then removed and the eye member 20 applied to the needle, whereafter the cable 44 is pulled through, ordinarily by means of a tractor or by horse power, whereby the block 46 and cable 44 may be positioned as indicated in Figure 1. The tower 12 may be then positioned as shown in Figure 1 and connected to the cable 44. An end portion of the cable 16 can be similarly inserted through the hay stack at the level desired, and the cutter 14 will be secured thereto. The cable 16 will, of course, be threaded through the pulleys 34 and 36, and sufficient tension applied to the cable 16, as by means of horse power or a tractor, will cause the cutter 14 to be drawn through the hay stack in a substantially straight line, wobbling of the cutter being minimized by the general form thereof and provision of the guiding knife 70. The threading operation is repeated before each cut. The upper pulley will be lowered or raised according to the level at which the cut is to be made.

It will be clear that all of the objects mentioned above are amply achieved by this invention, and that minor variations on the embodiment of this invention disclosed herein may be resorted to without departure from the spirit of the invention and without going beyond the metes and bounds of the appended claims.

Having described the invention, what is claimed as new is:

1. Apparatus for cutting a hay stack comprising a tower, means for securing the tower in leaning position on the side of the hay stack, a lower pulley fixed on a lower portion of the tower, an upper pulley vertically adjustably mounted on the tower above the lower pulley, a cutter having blades diverging from one end thereof, said blades being sharpened on their outer longitudinal edges, and a flexible cable extending through a portion of the hay stack and terminally secured to the apex end of said cutter and entrained through said pulleys, said cutter entering the hay stack on the opposite side from the tower and being pulled by said cable in a direction toward said tower.

2. Apparatus for cutting a hay stack comprising a tower, means for securing the tower in leaning position on the side of the hay stack, a lower pulley fixed on a lower portion of the tower, an upper pulley vertically adjustably mounted on the tower above the lower pulley, a cutter having blades diverging from one end thereof, said blades being sharpened on their outer longitudinal edges, and a flexible cable extending through a portion of the hay stack and terminally secured to the apex end of said cutter and entrained through said pulleys, said cutter entering the hay stack on the opposite side from the tower and being pulled by said cable in a direction toward said tower, said means comprising spikes mounted on the lower and upper ends of the tower and on the same side thereof to engage the hay stack, and an attaching cable secured at one end to an intermediate portion of the tower and having a block on the other end, whereby the block may be positioned on the side of the stack remote from the tower with the attaching cable extending through the stack.

3. Apparatus for cutting a hay stack comprising a tower, means for securing the tower in leaning position on the side of the hay stack, a lower pulley fixed on a lower portion of the tower, an upper pulley vertically adjustably mounted on the tower above the lower pulley, a cutter having blades diverging from one end thereof, said blades being sharpened on their outer longitudinal edges, and a flexible cable extending through a portion of the hay stack and terminally secured to the apex end of said cutter and entrained through said pulleys, said cutter entering the hay stack on the opposite side from the tower and being pulled by said cable in a direction toward said tower, said tower comprising a pair of inflexible beams having cross bars secured to the end portions, and said means comprising spikes mounted on said cross bars to engage the hay stack, and an attaching cable secured at one end to an intermediate portion of the tower and having a block on the other end, whereby the block may be positioned on the side of the stack remote from the tower with the attaching cable extending through the stack.

4. Apparatus for cutting a hay stack comprising a cutter having a pair of diverging arms, cutting teeth on the outer edges of the arms, a transverse bar connected to and between the arms adajacent the diverging ends thereof, a cutter guiding knife wider than and secured centrally of said transverse bar, said guiding knife being in a plane perpendicular to the plane of the diverging blades and on a line bisecting the angle of the blades, with the cutting edge of said guiding knife being in the direction of the apex, and means engaging the apex end of said cutter to pull the cutter through a hay stack.

5. Apparatus for cutting a hay stack comprising a cutter having a pair of diverging arms, cutting teeth on the outer edges of the arms, a transverse bar connected to and between the arms adjacent the diverging ends thereof, a cutter guiding knife wider than and secured centrally of said transverse bar, said guiding knife being in a plane perpendicular to the plane of the diverging blades and on a line bisecting the angle of the blades, with the cutting edge of said guiding knife being in the direction of the converging ends of the diverging arms, means to pull the cutter through a hay stack, a bifurcated draw bar, said arms having plate portions on their converging ends and disposed between the furcations of the draw bar, and means for adjustably mounting said plates on the furcations so as to vary the divergent angle of the arms, said transverse bar being removably secured on said arms.

FRED CHRISTOFFERSEN.

REFERENCES CITED

The following references are of record in the file of this patent:

UNITED STATES PATENTS

| Number | Name | Date |
|---|---|---|
| 1,415,789 | Cabalka | May 9, 1922 |
| 2,284,919 | Nielson | June 2, 1942 |